US008939493B1

United States Patent
Barthlow et al.

(10) Patent No.: US 8,939,493 B1
(45) Date of Patent: Jan. 27, 2015

(54) INSTRUMENT CLUSTER FINISH PANEL WITH TEAR SEAMS

(71) Applicant: Ford Global Technologies, LLC, Dearborn, MI (US)

(72) Inventors: Michael Barthlow, Canton, MI (US); Alan M. Perelli, Plymouth, MI (US); Jeff S. Vinton, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 14/041,659

(22) Filed: Sep. 30, 2013

(51) Int. Cl.
*B60R 21/20* (2011.01)
*B60R 13/02* (2006.01)

(52) U.S. Cl.
CPC ......... *B60R 13/0256* (2013.01); *B60R 13/0206* (2013.01)
USPC ................. 296/70; 296/1.08; 296/72; 180/90

(58) Field of Classification Search
USPC ................. 296/70, 72, 1.08; 280/750; 180/90
IPC ....................................................... B60R 21/20
See application file for complete search history.

(56) References Cited

U.S. PATENT DOCUMENTS

| 4,397,480 | A | | 8/1983 | Ouchi | |
|---|---|---|---|---|---|
| 5,067,747 | A | * | 11/1991 | Yokoyama | 280/777 |
| 5,758,920 | A | | 6/1998 | Stephan | |
| 7,913,790 | B2 | * | 3/2011 | Tanaka et al. | 180/90 |
| 2004/0160043 | A1 | * | 8/2004 | Litjens et al. | 280/732 |
| 2005/0104405 | A1 | * | 5/2005 | Trappe et al. | 296/70 |
| 2013/0334835 | A1 | | 12/2013 | Clark et al. | |

FOREIGN PATENT DOCUMENTS

DE 10130043 A1 1/2003

* cited by examiner

*Primary Examiner* — Pinel Romain
(74) *Attorney, Agent, or Firm* — Vichit Chea; MacMillan, Sobanski & Todd, LLC

(57) ABSTRACT

An instrument panel trim apparatus mounts in a vehicle to frame an instrument cluster above a collapsible steering column. An integrally molded plastic panel has an upper collar section, a lower bridge section, and a shroud section, wherein the upper collar section and lower bridge section are configured to form a frame around the instrument cluster. The upper collar section and lower bridge section converge along a pair of tear seams. The shroud section extends downward from the lower bridge section and has an arched shape to receive the steering column. A plurality of risers are disposed between the shroud section and the lower bridge section for concentrating stress at the tear seams when the shroud section is impinged by the steering column when collapsing, so that the tear seams separate and the lower bridge section and the shroud section can deflect upward.

20 Claims, 5 Drawing Sheets

US 8,939,493 B1

INSTRUMENT CLUSTER FINISH PANEL WITH TEAR SEAMS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive instrument clusters, and, more specifically, to an instrument cluster trim panel adapted to breakaway during an impact by a collapsible steering column so that the steering column can compress without significant hindrance from the trim panel.

To prevent injuries to drivers in automotive vehicles during a crash, collapsible steering columns are employed which move forward in response to the occupant loading the airbag-steering wheel. The forward movement of the steering column is referred to as the stroke of the column. For aesthetic purposes, the steering column includes an upper shroud and other components to provide a finished look and to hide associated structures such as struts and wiring. During collapse, the stroke of the steering column can lead to collision between various trim structures, such as the upper shroud of the steering column impacting a trim panel disposed around an instrument cluster.

Since a rigidly-fixed finish panel at the instrument cluster could undesirably impede the stroke of the steering column, a releasable finish panel structure has been employed wherein a breakable mounting is used for at least a portion of the finish panel so that it can pop off its mounting in order to get out of the way of the collapsing steering column. Typically, separate upper and lower cluster finish panel sections are employed wherein the lower or bridge section is a separate element mounted to the vehicle by releasable clips.

Due to the use of a separate bridge portion, the associated manufacturing processes require extra tooling and extra assembly steps. Furthermore, the system cost is increased due to the number of assembly pieces that must be designed, fabricated, shipped, and tracked. The need to assemble the separate pieces also introduces a fit and finish requirement that is hard to achieve and maintain, potentially resulting in a poor appearance if the separate parts are not properly aligned.

Thus, it would be desirable to provide a finish panel structure for an instrument cluster with reduced piece count, reduced assembly steps, and improved fit and finish while preserving good breakaway performance in order to avoid detrimental effects on the collapse of the steering column.

SUMMARY OF THE INVENTION

In one aspect of the invention, an instrument panel trim apparatus is provided for mounting in a vehicle to frame an instrument cluster above a collapsible steering column. An integrally molded plastic panel has an upper collar section, a lower bridge section, and a shroud section, wherein the upper collar section and lower bridge section are configured to form a frame around the instrument cluster. The upper collar section and lower bridge section converge along a pair of tear seams. The shroud section extends downward from the lower bridge section and has an arched shape to receive the steering column. A plurality of risers are disposed between the shroud section and the lower bridge section for concentrating stress at the tear seams when the shroud section is impinged by the steering column when collapsing, so that the tear seams separate and the lower bridge section and the shroud section can deflect upward.

DETAILED DESCRIPTION OF PREFERRED EMBODIMENTS

Figure 1:
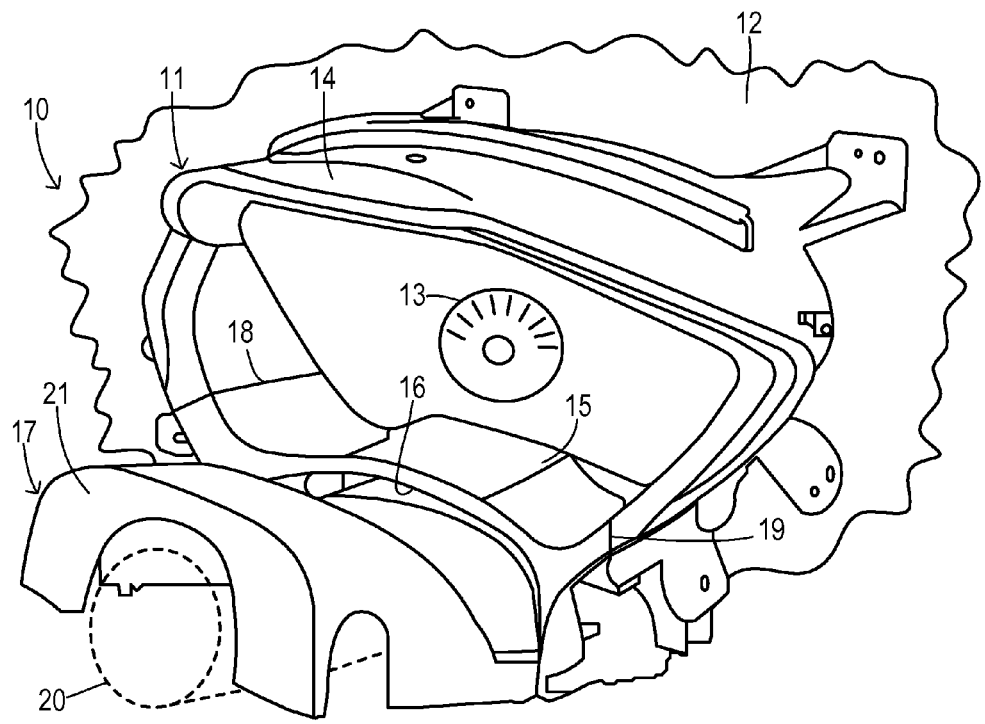
FIG. 1 is a front, perspective view of an instrument cluster trim system with an adjacent upper shroud of a steering column.

Referring now to FIG. 1, a vehicle apparatus 10 includes an instrument cluster finish panel 11 for mounting to an instrument panel 12 in order to frame various gauges and instrument displays such as a gauge 13. Finish panel 11 includes separately assembled pieces including an upper panel 14 which screws directly onto panel 12 and a lower panel 15 with a concave side 16 for receiving a steering column assembly 17. Steering column assembly 17 includes a steering column 20 (shown in dashed lines) for carrying a steering wheel (not shown) at one end and having an upper shroud 21 mounted to its upper side.

Figure 2:
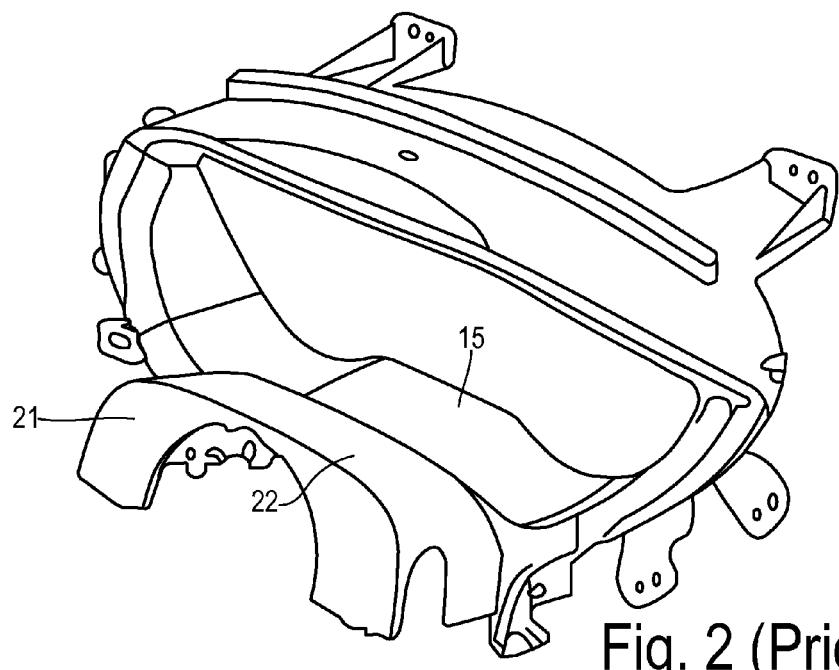
FIG. 2 is a front, perspective view of the instrument cluster trim system of FIG. 1 with the upper shroud of the steering column making contact with the instrument cluster trim panel during a collapse of the steering column during a crash event.

As shown in FIG. 2, when steering column assembly 17 strokes forward in response to an impacting driver on the steering wheel during a crash, a bulge 22 of upper shroud 21 contacts lower panel 15. Rather than being firmly screwed into place, lower panel 15 is mounted using releasable clips that release in response to a force applied by upper shroud 21. Upper shroud 21 and/or lower panel 15 preferably have a sloping surface to provide an upward vertical component to the force, whereby lower panel 15 moves upward upon release of the clips. Thus, the instrument cluster finish panel 11 creates no significant impediment to collapse of the steering column. However, the separate pieces that must be manufactured and assembled to complete the finish panel result in additional costs and fit and finish issues. Lines 18 and 19 represent the adjacent edges of the separate pieces where slight misalignments can create a poor appearance.

Figure 3:
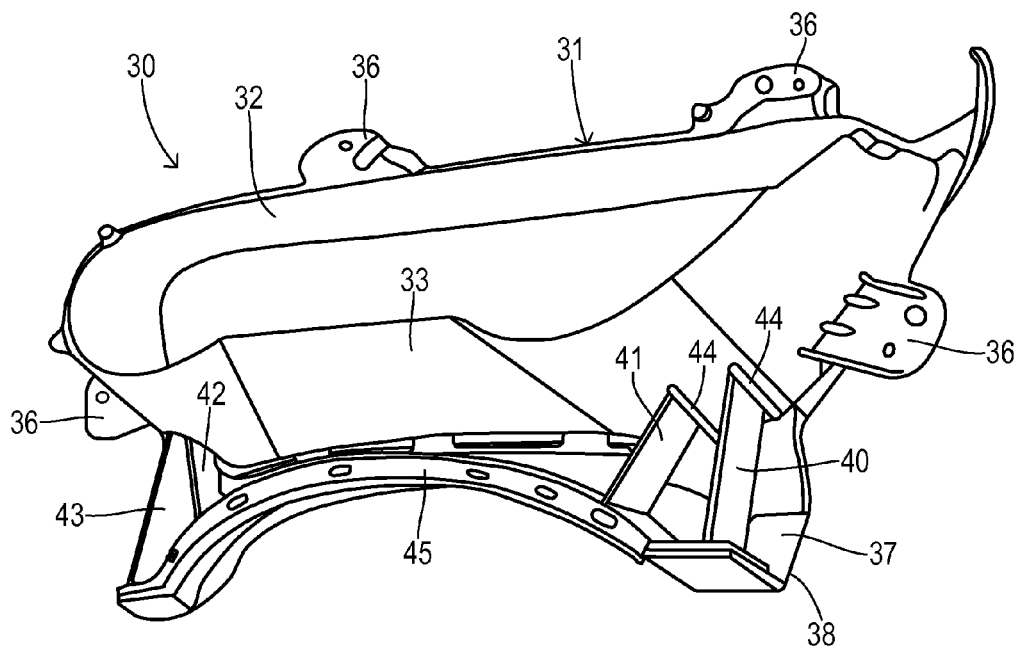
FIG. 3 is a rear, perspective view of an instrument cluster trim system according to one embodiment of the present invention.
Figure 4:
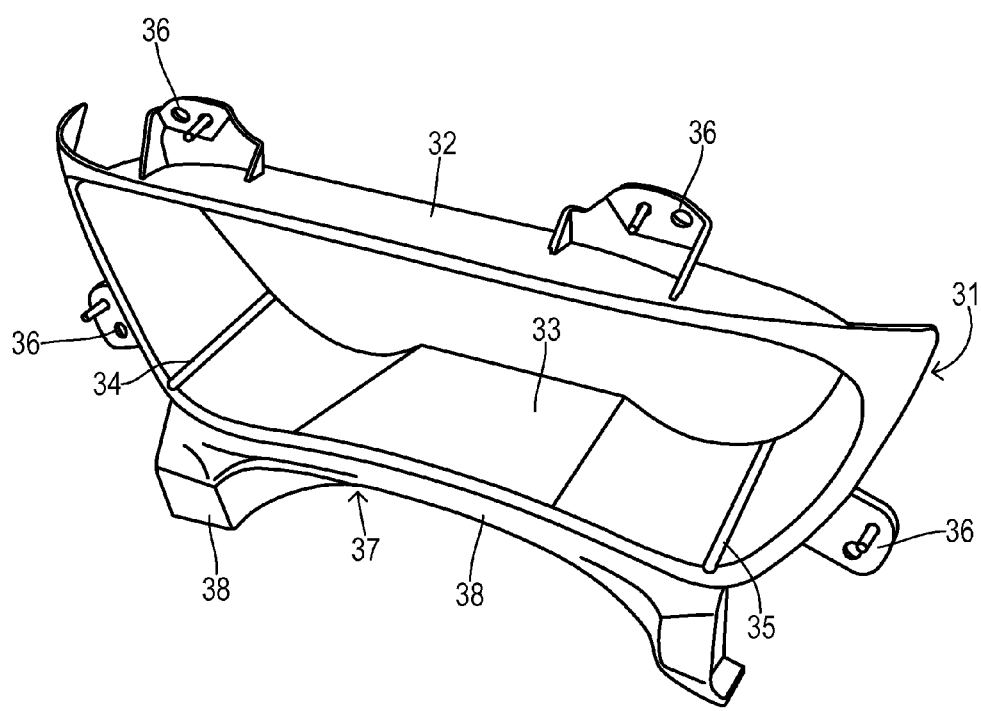
FIG. 4 is a front, perspective view of the instrument cluster trim system of FIG. 3.

FIGS. 3 and 4 show an instrument panel trim apparatus 30 for framing an instrument cluster above a collapsible steering column with reduced piece count and elimination of fit and finish issues. An integrally molded plastic finish panel 31 has an upper collar section 32 and a lower bridge section 33 that converge along a pair of tear seams 34 and 35. Panel 31 includes a plurality of mounting flanges 36 to facilitate a rigid mount to an instrument panel substrate around an instrument cluster so that collar section 32 and bridge section 33 form a framing wall surrounding the instrument cluster. In the illustrated embodiment, collar section 32 and bridge section 33 are shown forming a peripheral ring for framing the complete periphery around an instrument cluster. In alternative embodiments, upper collar section 32 does not entirely encircle the instrument cluster.

Panel 31 further includes a shroud section 37 that extends downward from bridge section 33 and has an arched shape configured to receive the steering column (while remaining spaced away from the steering column by a short distance under pre-crash conditions). Mounting flanges 36 extend only from upper collar section 32, so that bridge section 33 and shroud section 37 are normally held in place through the support of tear seams 34 and 35. As described below, tear seams 34 and 35 are arranged to separate in response to collapse of the steering column, thereby permitting sections 33 and 37 to move out of the way of the collapsing steering column.

Shroud section 37 preferably includes a forward sloped edge 38 for contacting the collapsing steering column to generate an upward force for tearing tear seams 34 and 35. To concentrate the upward force along tear seams 34 and 35, a plurality of risers 40-43 are provided, which are disposed between shroud section 37 and bridge section 33. In one preferred embodiment, risers 40-43 may be comprised of a separately molded plastic component. Bridge section 33 may preferably include a plurality of downward extending ribs 44 for capturing and confining the ends of risers 40-43. Furthermore, risers 40-43 may be integrally molded with a clip section 45 for attaching to shroud section 37.

Figure 5:
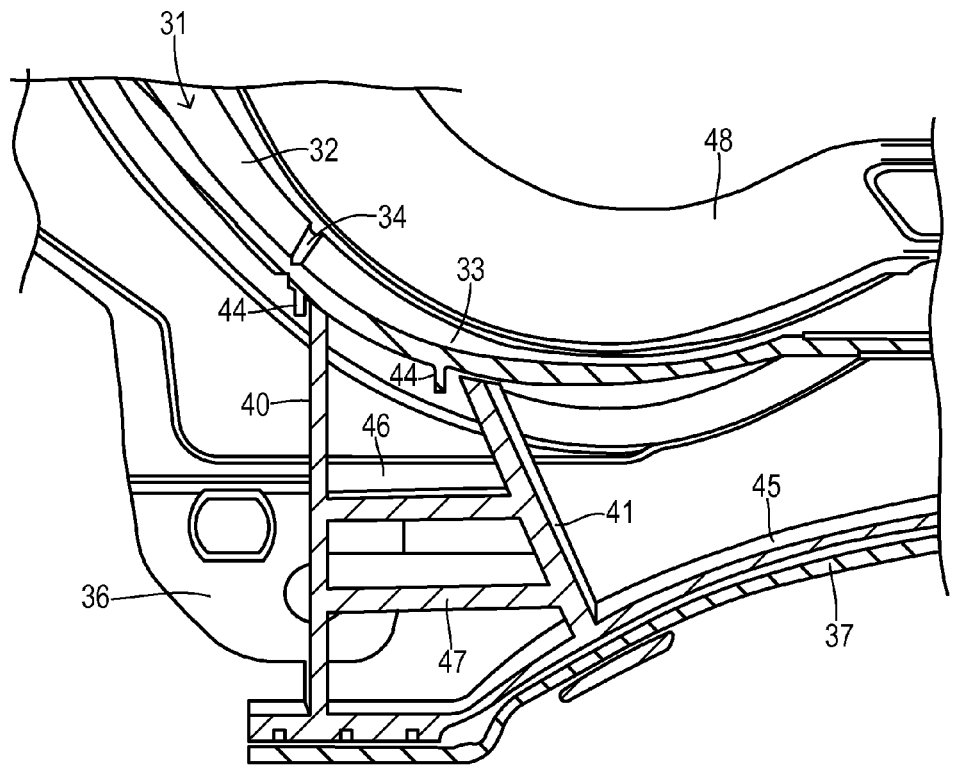
FIG. 5 is a vertical cross section of a trim panel and risers according to one embodiment of the invention.

FIG. 5 shows a side-to-side, vertical cross section showing certain elements of the invention in greater detail. Clip section 45 captures a lower edge of shroud section 37 and may be attached by any convenient method such as a snap fit or heat staking, for example. Risers 40 and 41 may be joined by cross-braces 46 and 47 for strengthening them and improving the upward transmission of forces into bridge section 33 in the vicinity of tear seam 34. Tear seam 34 is comprised of a continuous groove between a forward end and a rearward end of finish panel 31. Preferably, each tear seam is comprised of matching grooves on inner and outer surfaces of panel 31 so that bridge section 33 is sufficiently frangible for tearing while being able to maintain structural integrity during pre-crash conditions. Element 48 designates a portion of the instrument cluster itself.

Figure 6:
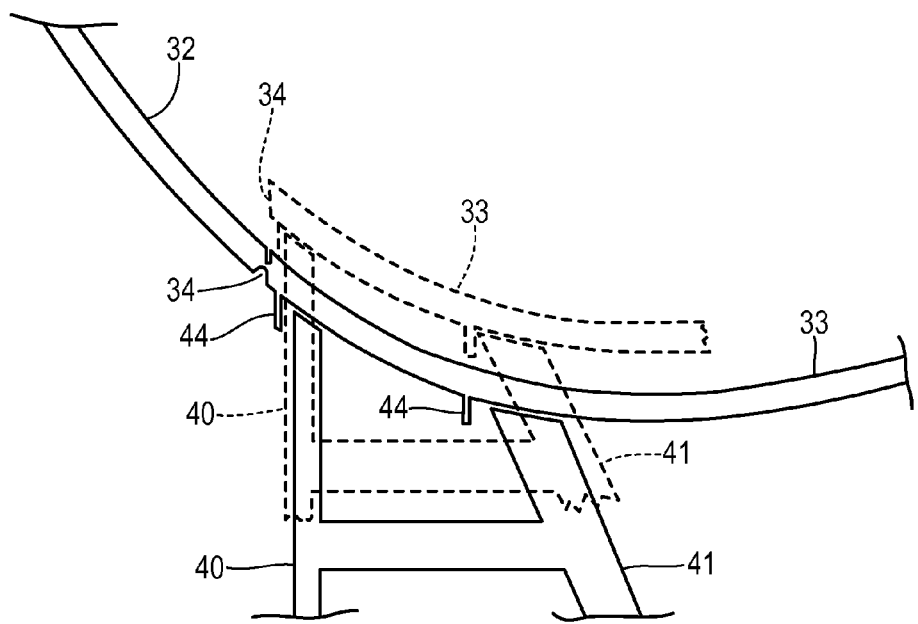
FIG. 6 is a diagrammatic view showing a panel with tear seam and a riser before an impact in solid lines and showing vertical movement of the riser and a bridge portion of the trim panel after an impact in dashed lines.

FIG. 6 shows the tearing of tear seam 34. The pre-crash condition is shown in solid lines with risers 40 and 41 contacting bridge section 33 near ribs 44. When the steering column assembly (e.g., an upper shroud) contacts the shroud section of the finish panel, the shroud section deflects in an upward direction forcing risers 40 and 41 against bridge section 33 with sufficient force to separate tear seam 34, thereby allowing bridge section 33 to move upward to the position shown in dashed lines. A preferred orientation of tear seams 34 and 35 is to be substantially in respective vertical planes that are substantially parallel to a longitudinal axis of the steering column. In other words, a front to back (i.e., car forward to car rearward) direction is preferred for aesthetic and functional reasons. However, other straight or curved shapes and orientations can be used as long as upward vertical movement is achievable upon separation of the tear seams. As shown, the position of tear seams 34 and 35 may substantially correspond to the location where the separate pieces of the prior art came together.

Figure 7:
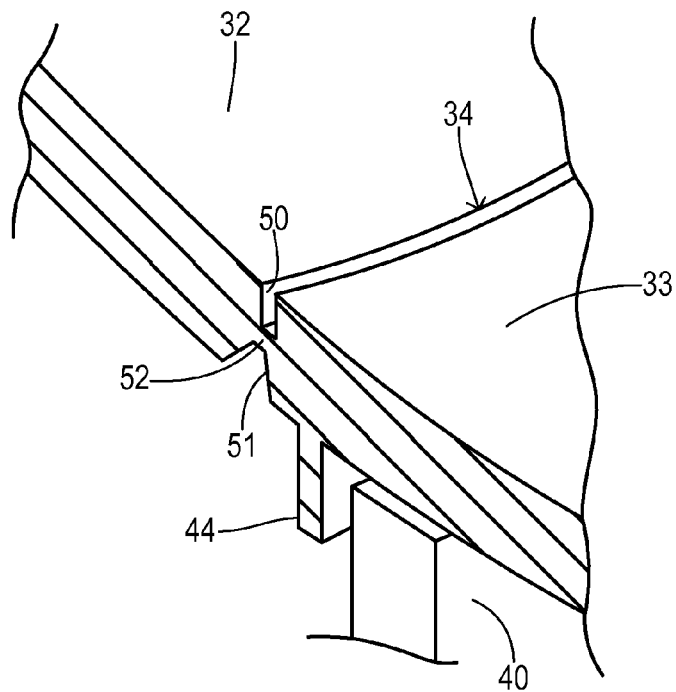
FIG. 7 is a cross section showing a tear seam in the trim panel in greater detail, with an adjacent rib for capturing a riser.

FIG. 7 shows a preferred configuration of a tear seam 34 in greater detail. On a visible (i.e., Class A) inner surface between collar section 32 and bridge section 33, a narrow groove 50 is formed. On an opposite, invisible (i.e., Class B) surface of the panel, a wider groove 51 is provided, leaving a cross beam 52 having a selected thickness which is determined according the strength of the molded material used to manufacture the trim panel. Groove 50 may be formed using an appropriate slide as part of a die in an injection molding machine in order to achieve a desirable smooth finished appearance.

Figure 8:
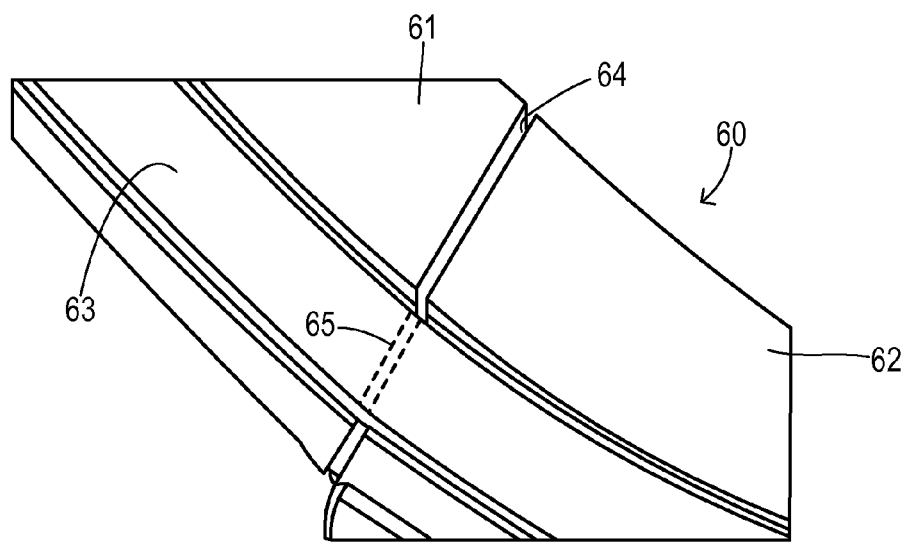
FIG. 8 is a perspective view showing a decorative accent strip applied to the trim panel.

FIG. 8 shows an alternative embodiment wherein a framing wall 60 with an upper collar section 61 and a lower bridge section 62 includes a recessed accent strip 63. Accent strip 63 may preferably be formed as a complete ring passing over the entire periphery of framing wall 60 and over the tears seams (including tear seam 64). Strip 63 may preferably be comprised of a plastic part with a chrome finish or with other types of coloration or styling effects. Accent strip 63 may include a pair of hidden grooves (e.g., groove 65 coincident with tear seam 64) to facilitate the breaking of accent strip 63 when tear seam 64 separates.

Figure 9:
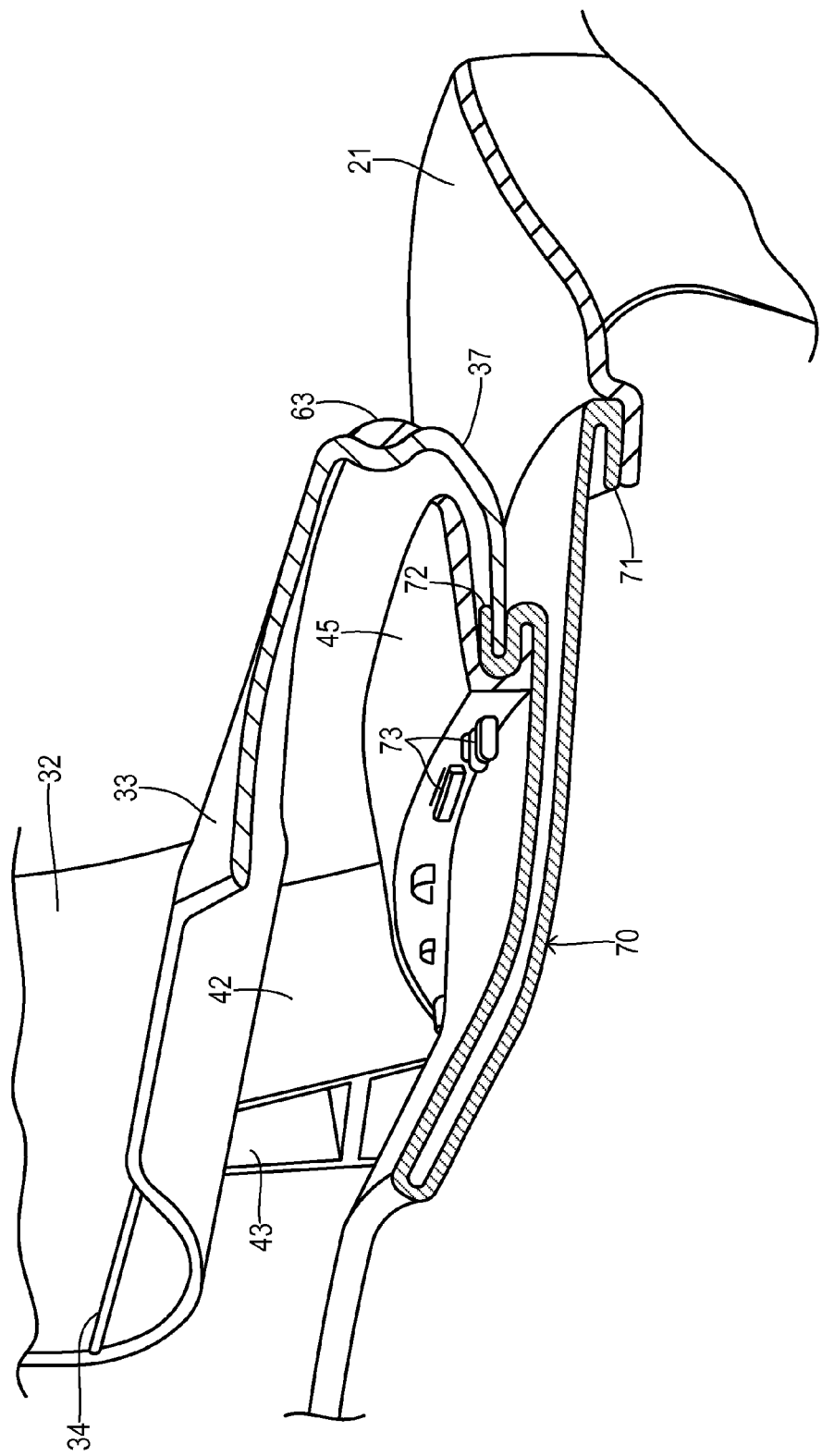
FIG. 9 is a partial vertical cross-sectional view showing a riser integrated with a clip, and a gap hider retained between the clip and the trim panel.

FIG. 9 shows a further embodiment of the invention in which a flexible sheet known as a gap hider sheet 70 is retained between the instrument cluster finish panel and the steering column assembly. Gap hider sheet 70 is preferably comprised of vinyl and is configured to act as a curtain preventing a view through the remaining gap between the finish panel and steering column assembly. In addition, hider sheet 70 can act as a tether on the released bridge section to keep it from becoming a projectile during the later stages of a crash. Sheet 70 has a first edge 71 attached to upper shroud 21 of the steering column assembly as known in the prior art. Attachment may be by adhesive, for example. Sheet 70 has a second edge 72 which is captured between clip section 45 and shroud section 37. Sheet 70 has appropriate openings (not shown) for receiving connector tabs 73 which also attach clip section 45 to shroud section 37. After sheet 70 is folded over the end of shroud section 37, clip section 45 is installed and snaps into place, thereby trapping sheet 70. Thus, a single part for implementing the risers 42 and 43 and a gap hider retainer is used, thereby avoiding extra part count and avoiding the conventional step of heat staking of the gap hider retainers.

What is claimed is:

1. Instrument panel trim apparatus for mounting in a vehicle to frame an instrument cluster above a collapsible steering column, comprising:
   an integrally molded plastic panel having an upper collar section, a lower bridge section, and a shroud section, wherein the upper collar section and lower bridge section are configured to form a frame around the instrument cluster, wherein the upper collar section and lower bridge section converge along a pair of tear seams, and wherein the shroud section extends downward from the lower bridge section and has a arched shape to receive the steering column; and
   a plurality of risers disposed between the shroud section and the lower bridge section for concentrating stress at the tear seams when the shroud section is impinged by the steering column when collapsing, so that the tear seams separate and the lower bridge section and the shroud section can deflect upward.

2. The apparatus of claim 1 wherein the collar section and lower bridge section form a peripheral ring.

3. The apparatus of claim 1 wherein each tear seam is comprised of a continuous groove from a forward end to a rearward end of the panel.

4. The apparatus of claim 3 wherein each tear seam is comprised of matching grooves in inner and outer surfaces of the panel.

5. The apparatus of claim 1 wherein the tears seams are each substantially oriented in a respective vertical plane that is substantially parallel to a longitudinal axis of the steering column.

6. The apparatus of claim 1 wherein the risers are comprised of molded plastic which is molded separately from the panel.

7. The apparatus of claim 6 wherein the panel has a plurality of ribs flanking the tear seams for capturing the risers.

8. The apparatus of claim 6 wherein the risers are integrally molded with a clip section configured to attach to the shroud section of the panel.

9. The apparatus of claim 8 further comprising a gap hider sheet having a first edge configured to attach to the steering column and a second edge captured between the clip section and the shroud section of the panel.

10. The apparatus of claim 1 further comprising a recessed accent strip circumscribing the upper collar section and the bridge section, wherein the accent strip crosses the tear seams.

11. The apparatus of claim 10 wherein the accent strip includes a pair of hidden grooves coincident with the tear seams for breaking the accent strip when the tear seams separate.

12. Vehicle apparatus comprising:
an integrally molded panel having a framing wall surrounding an instrument cluster with an upper section divided from a bridge section by a pair of tear seams, and the panel having a shroud extending downward from the bridge section; and
a plurality of risers between the shroud and the bridge section for concentrating stress at the tear seams created by upward movement of the shroud to tear the tear seams.

13. The vehicle apparatus of claim 12 wherein the shroud has an arched shape for receiving a steering column, and wherein the tear seams are each substantially oriented in a respective vertical plane that is substantially parallel to a longitudinal axis of the steering column.

14. The vehicle apparatus of claim 12 wherein each tear seam is comprised of matching grooves in inner and outer surfaces of the panel.

15. The vehicle apparatus of claim 12 wherein the risers are comprised of molded plastic which is molded separately from the panel.

16. The vehicle apparatus of claim 15 wherein the panel has a plurality of ribs flanking the tear seams for capturing the risers.

17. The vehicle apparatus of claim 15 wherein the risers are integrally molded with a clip section configured to attach to the shroud of the panel.

18. The vehicle apparatus of claim 17 further comprising a gap hider sheet having a first edge captured between the clip section and the shroud of the panel and a second edge configured to attach to the steering column.

19. The vehicle apparatus of claim 12 further comprising a recessed accent strip circumscribing the framing wall, wherein the accent strip crosses the tear seams.

20. The vehicle apparatus of claim 19 wherein the accent strip includes a pair of hidden grooves coincident with the tear seams for breaking the accent strip when the tear seams are torn.

\* \* \* \* \*